US008923581B2

(12) United States Patent
Souza et al.

(10) Patent No.: US 8,923,581 B2
(45) Date of Patent: Dec. 30, 2014

(54) INTERACTIVE 3-D EXAMINATION OF ROOT FRACTURES

(75) Inventors: Andre Souza, Webster, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 119 days.

(21) Appl. No.: 13/422,145

(22) Filed: Mar. 16, 2012

(65) Prior Publication Data

US 2013/0243276 A1 Sep. 19, 2013

(51) Int. Cl.
*G06K 9/00* (2006.01)

(52) U.S. Cl.
USPC .......................................................... 382/128

(58) Field of Classification Search
CPC .............. G06T 7/0079; G06T 2200/04; G06T 2200/20144; G06T 2207/30036; G06T 2207/20101; G06T 2207/10081; G06T 7/0081; G06T 2207/0093
USPC ......................................... 382/128, 131, 181
See application file for complete search history.

(56) References Cited

U.S. PATENT DOCUMENTS

| 6,632,089 B2 * | 10/2003 | Rubbert et al. ................. 433/24 |
| 2008/0030497 A1 | 2/2008 | Hu et al. |
| 2009/0079738 A1 | 3/2009 | Liao |
| 2010/0246915 A1 * | 9/2010 | Yamakoshi et al. .......... 382/131 |
| 2013/0169639 A1 * | 7/2013 | Shi et al. ....................... 345/424 |

OTHER PUBLICATIONS

Akhoondali et al, "Rapid Automatic Segmentation and Visualization of Teeth in CT-Scan Data", Journal of Applied Science9(11): 2031-2044, 2009 ISSN 1812-5654.*
European Search Report, Application No. EP 13 00 1119, Dated Jun. 28, 2013, 2 pages.
Chiarelli et al., "Techniques to Improve Preoperative Planning Precision for Oral Implantology", IEEE Transactions on Instrumentation and Measurement, Vo. 59, No. 11, Nov. 2010, pp. 2887-2897.
Falcao, et. al. "The Image Foresting Transformation: Theory, Algorithm, and Applications," in *IEEE Trans on Pattern Analysis and Machine Intelligence*, 26 (1): pp. 19-29, 2004.
Souza et. al., "Volume rendering in the presence of partial volume effects," *IEEE Trans on Medical Imaging*, 24(2): pp. 223-225, 2005.
Paloma, et al. "Cone Beam CT for Diagnosis and Treatment Planning in Trauma Cases" , *Dental Clinics of North America*, vol. 53, issue 4, Oct. 2009, pp. 717-727.
Hassan et al. "Detection of Vertical Root Fractures in Endodontically Treated Teeth by a Cone Beam Computed Tomography Scan", *Journal of Endodontics*, May 2009, 35 (5), pp. 719-722.

(Continued)

*Primary Examiner* — Tom Y Lu

(57) ABSTRACT

A method for 3-D interactive examination of a subject tooth, executed at least in part by a computer, obtains volume image data containing at least the subject tooth and background content adjacent to the subject tooth and displays a first image from the volume data that shows at least the subject tooth and the background content. A portion of the background content in the first image is identified according to a first operator instruction. Tooth content for at least the subject tooth in the first image is identified according to a second operator instruction. At least the subject tooth is segmented from within the volume data according to the first and second operator instructions. The segmented subject tooth is then displayed.

15 Claims, 18 Drawing Sheets

(56) References Cited

OTHER PUBLICATIONS

Patel et al., "New dimensions in endodontic imaging: part 1. Conventional and alternative radiographic systems", *International Endodontic Journal*, 2009, pp. 1-16.

Cotton et al., "Endodontic Applications of Cone-Beam Volumetric Tomography", *Journal of Endodontics*, Sep. 2007, 33 (9), pp. 1121-1132.

Alexandre X. Falcao et al., Interactive Volume Segmentation With Differential Image Foresting Transforms, IEEE Transactions on Medical Imaging, vol. 23, No. 9, Sep. 2004, 9 pages.

* cited by examiner

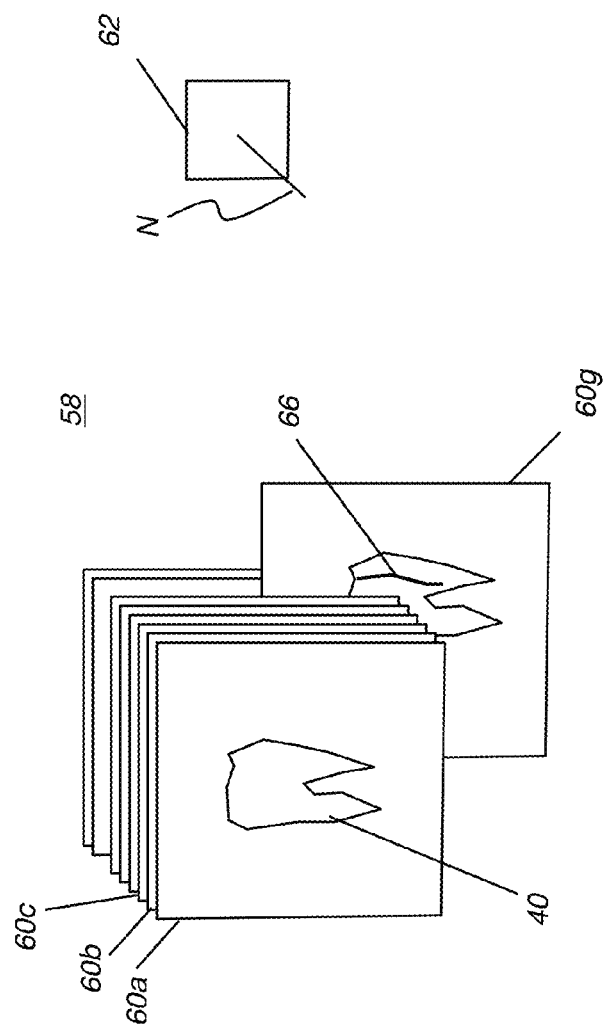

US 8,923,581 B2

INTERACTIVE 3-D EXAMINATION OF ROOT FRACTURES

FIELD OF THE INVENTION

The invention relates generally to dental imaging, and in particular to a radiographic imaging apparatus for viewing volume images of tooth structures.

BACKGROUND

Cone beam computed tomography (CBCT) is an X-ray imaging modality capable of acquiring three-dimensional information of the human anatomy with a substantially lower radiation dose to the patient as compared to conventional medical computed tomography (CT) systems. Cone beam CT systems capture volumetric data sets by using a high frame rate digital radiography (DR) detector and an x-ray source, typically affixed to a gantry that rotates about the subject to be imaged, directing, from various points along its orbit around the subject, a divergent cone beam of x-rays toward the subject. The CBCT system captures projections throughout the rotation, for example, one 2-D projection image at every degree of rotation. The projections are then reconstructed into a 3D volume image using various techniques. Among the most common methods for reconstructing the 3-D volume image are filtered back projection approaches. One area of particular interest for CBCT use is in endodontics. In conventional practice, detection of a problem responsive to endodontic treatment begins with the patient's report of pain. The practitioner works with the patient to isolate the suspect tooth and may obtain one or more two-dimensional (2-D) periapical radiographs to help identify any abnormalities of the root structure and surrounding bone structure. In many cases, visual inspection of the 2-D image can help to identify the problem. However, detection of some types of conditions remains a challenge with conventional 2-D images. In particular, some types of Vertical root fracture (VRF) can be difficult to detect in the periapical image. Vertical root fracture is a severe type of tooth fracture that affects the root, causing pain due to infection and inflammation and often leading to tooth extraction.

The improved image quality available from CBCT imaging and its capability for displaying very low contrast tissue regions makes CBCT a promising technology for assessment of VRF and other endodontic conditions. This includes use of CBCT imaging to support root canal therapy, as shown in the sequence of FIG. 1. In this type of treatment, an infected tooth 20 has an abscess 22 that is to be treated. An opening 24 is made in tooth 20 and a tool 28 used to access and remove infected material. A plugger 30 then fills root portions of tooth 20 with gutta percha or other suitable material. The tooth 20 can then be repaired with a filling 34 or with a crown 36 that is fitted onto a post 38 inserted by the practitioner.

While CBCT imaging can be used to improve detection of VRF and other conditions requiring endodontic treatment, however, difficulties remain. Manipulating the CBCT image can be challenging, particularly for practitioners and technicians who are new to volume imaging technology. Isolating the particular views that most distinctly reveal the problem condition can be difficult or frustrating for the practitioner, burdening the user with a time commitment for training and using the CBCT system.

Thus, it can be seen that there is a need for an interactive operator interface that provides tools that can be quickly learned and that provides a more intuitive viewer experience, allowing the practitioner to make effective use of CBCT imaging for endodontic applications.

SUMMARY OF THE INVENTION

An aspect of the present invention is to advance the art of dental imaging, particularly for volume imaging allowing interactive examination of teeth and their root structures. Advantageously, embodiments of the present invention allow an operator to select a specific tooth or group of teeth from volume image data and to modify the angle at which the tooth is viewed. In addition, the operator is also able to page through slices of the tooth from angles other than the standard coronal, sagittal, or axial images provided in conventional volume image presentation. Interactive operation allows the operator to progressively improve tooth segmentation used to isolate the data for a particular tooth from other volume image data.

In accordance with one embodiment, the present invention can provide a method for 3-D interactive examination of a subject tooth, the method executed at least in part by a computer and comprising: obtaining volume image data containing at least the subject tooth and background content adjacent to the subject tooth; displaying a first image from the volume data that shows at least the subject tooth and the background content; identifying a portion of the background content in the first image according to a first operator instruction; identifying tooth content for the at least the subject tooth in the first image according to a second operator instruction; segmenting the at least the subject tooth from within the volume data according to the first and second operator instructions; and displaying the segmented subject tooth.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 4A and 4B are schematic views that show arrangement of slices at alternate angles for the same volume image content.

DESCRIPTION OF EXEMPLARY EMBODIMENTS

Figure 1:
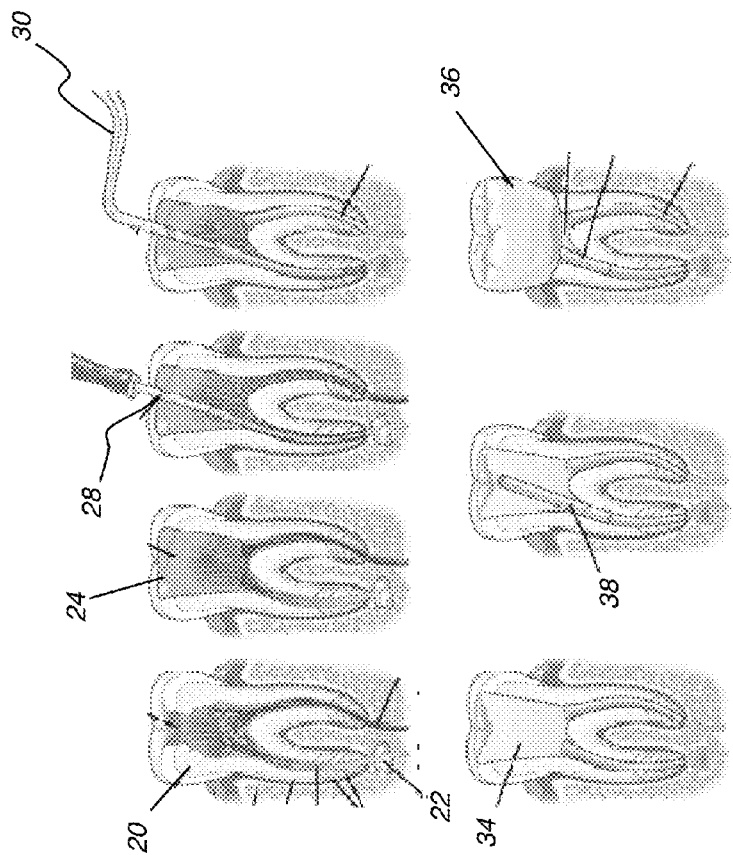
FIG. 1 is a sequence diagram that shows steps for root canal therapy.

The following is a description of exemplary embodiments of the invention, reference being made to the drawings in which the same reference numerals identify the same elements of structure in each of the several figures. Where they are used, the terms "first", "second", and the like, do not necessarily denote any ordinal or priority relation, but may be used for more clearly distinguishing one element or time interval from another.

In the context of the present disclosure, the term "image" refers to multi-dimensional image data that is composed of discrete image elements. For 2-D images, the discrete image elements are picture elements, or pixels. For 3-D images, also termed volume images, the discrete image elements are volume image elements, or voxels. In the context of the present disclosure, the term "spline" is equivalent to a curve, free-form curve, or line.

As described by Falcao, et al. in the article entitled "The Image Foresting Transformation: Theory, Algorithm, and Applications," in *IEEE Trans on Pattern Analysis and Machine Intelligence*, 26 (1): 19-29, 2004), a multi-dimensional image can alternately be expressed as a set of nodes and arc-weights. By taking advantage of this alternate type of data structure, one can devise simple, effective and very fast (sub-linear) processing algorithm in the control processing unit (CPU) or graphics processing unit (GPU) for processing substantial amounts of image data. In the context of the present disclose, the term "IFT" refers to a framework that represents the image data as a set of nodes and arcs-weights, also known as the image foresting transform.

In the context of the present invention, the terms "viewer", "user", and "operator" are considered to be equivalent terms for the person who uses the system and observes and manipulates the displayed view of the volume data for one or more of the patient's teeth. The operator can be a dental practitioner or technician or other person The term "highlighting" for a displayed feature has its conventional meaning as is understood to those skilled in the information and image display arts. In general, highlighting uses some form of localized display enhancement to attract the attention of the viewer. Highlighting a portion of an image, such as an individual organ, bone, or structure, or a path from one chamber to the next, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

Figure 2:
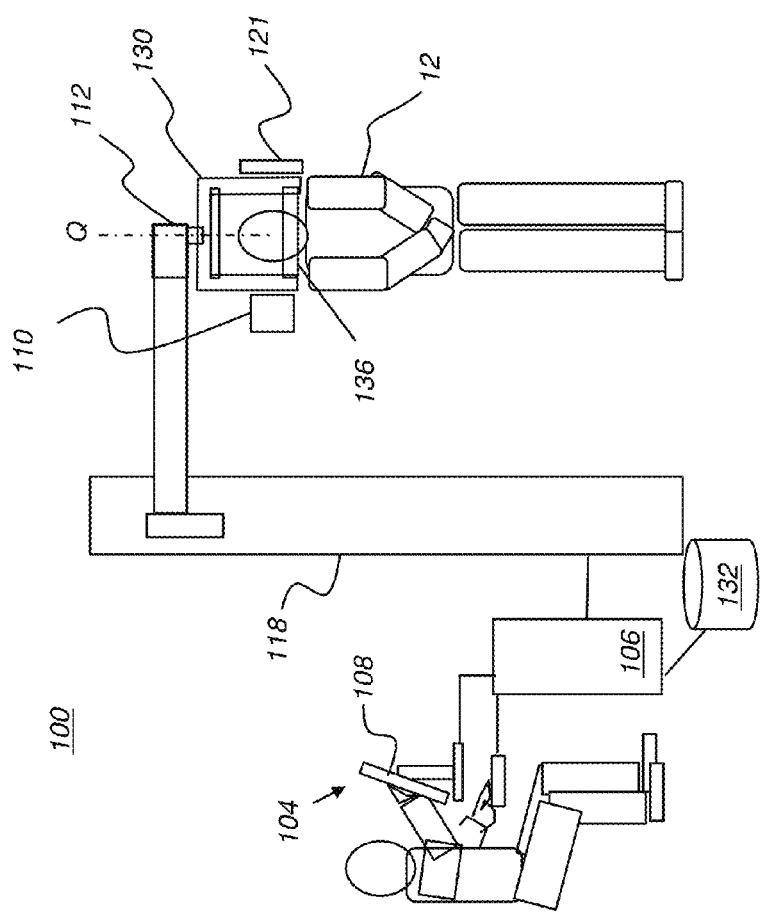
FIG. 2 is a schematic block diagram that shows components of a CBCT imaging apparatus for dental imaging.

The schematic diagram of FIG. 2 shows an imaging apparatus 100 for volume imaging, such as CBCT imaging, in which a succession of two or more 2-D images is obtained and images of adjacent content are processed to form a 3-D or volume image. A rotatable mount 130 is provided on a column 118 for imaging a patient 12. Mount 130 maintains an x-ray source 110 and a radiation sensor 121 on opposite sides of the head of patient 12 and rotates to orbit source 110 and sensor 121 in a scan pattern about the head. Mount 130 rotates about an axis Q that corresponds to a central portion of the patient's head, so that its attached components orbit about the head. Sensor 121, a digital radiography sensor according to an embodiment of the present invention, is coupled to mount 130, opposite x-ray source 110 that emits a radiation pattern suitable for CBCT volume imaging. An optional head support 136, such as a chin rest or bite element, provides stabilization of the patient's head during image acquisition. A computer 106 has an operator interface 104 and a display 108 for accepting operator commands and for display of volume images obtained by imaging apparatus 100. Computer 106, with memory 132, is in signal communication with sensor 121 for obtaining image data and provides signals for control of source 110 and, optionally, for control of a rotational actuator 112 for mount 130 components.

Embodiments of the present invention process images obtained from imaging apparatus 100 to provide a volume image that allows a practitioner to view teeth and supporting structures in detail. According to an embodiment of the present invention, the volume image data that is obtained from imaging apparatus 100 enable the practitioner to view images of a tooth that can allow assessment of endodontic conditions that can be difficult to detect using conventional radiography images.

Figure 3B:
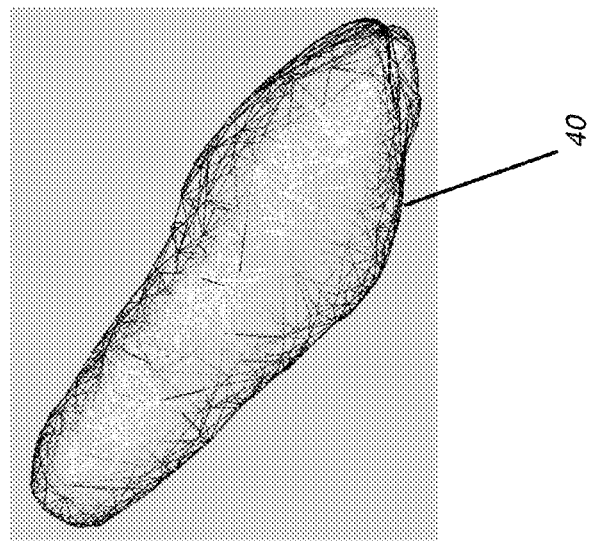
FIG. 3B is a plan view showing a segmented tooth of interest from operator markup as provided in FIG. 3A.
Figure 3A:
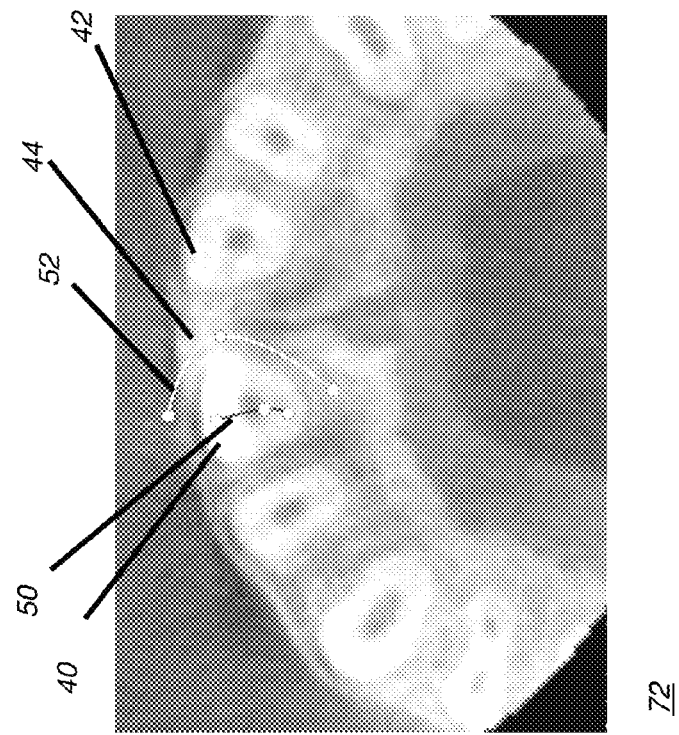
FIG. 3A is a plan view that shows an image and markings that provide operator instructions for tooth segmentation.

FIG. 3A shows a plan view of an image 72 obtained using volume imaging apparatus 100. Image 72 can be any slice of the image, as the image slice would appear on display 108 (FIG. 2). Image 72 is used as a type of index image for markup. FIG. 3A shows, within image 72 the tooth of interest, a subject tooth 40, that the practitioner would like to view in detail. One or more neighboring or adjacent teeth 42 may also be shown. Background content 44 is in the area outside of teeth 40 and 42. A first operator instruction, a tooth identifier curve or spline 50, indicates the location of tooth content for subject tooth 40. A second operator instruction, a background or sculpting curve or spline 52 can be drawn on image 72 outside the border of the subject tooth or within any suitable background area.

In the example of FIG. 3A, spline 52 indicates picture elements that lie in the background content 44, such as in the area outside of or between teeth 40 and 42. Tooth identifier spline 50 can span a single tooth in the displayed image 72, or can span multiple teeth, as described in more detail subsequently.

According to an embodiment of the present invention, splines 50 and 52 are entered using a touch screen, that is, where display 108 (FIG. 2) associated with the imaging apparatus 100 is a touch screen device. In an alternate embodiment, another type of pointer device is used, such as a mouse, stylus, or joystick, for example. According to an embodiment of the present invention, splines of different colors are used to identify tooth content and differentiate the tooth content from background content for the segmentation algorithm. Splines 50 and 52 can be entered in any order; color is used to help differentiate tooth from background content. To enhance processing speed, the segmentation algorithm itself may optionally operate on a low-resolution copy of the volume image data.

Splines 50 and 52 provide sufficient information for IFT-based segmentation of subject tooth 40 from the balance of the volume image data, in real time. A 3-D model of subject tooth 40 is displayed side-by-side with highlighted 2-D segmented regions in the slice image, as is shown in the example of FIGS. 3A and 3B. According to an embodiment of the present invention, the subject tooth is highlighted on the display screen as verification to the operator. Highlighting can be indicated by change of color, heightened contrast, outlining, or some other display enhancement feature.

Figure 5B:
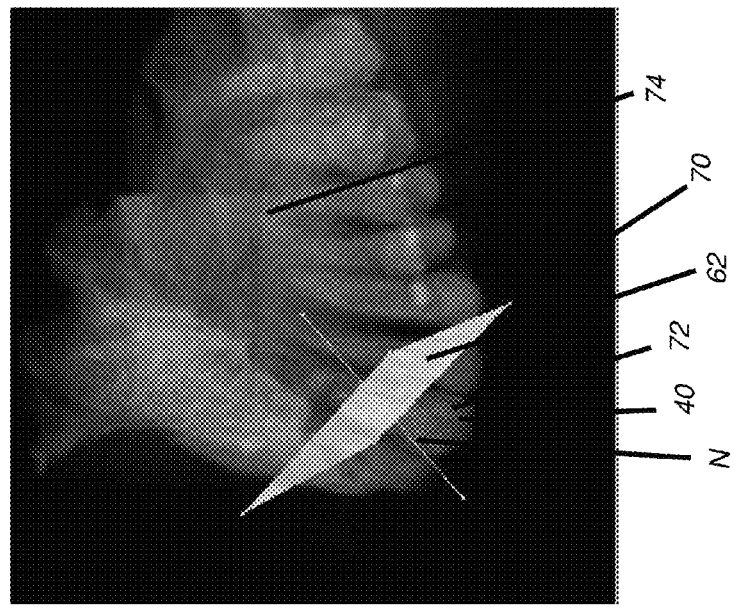
FIGS. 5A and 5B show results and tools for an interactive utility that provides 3D visualization of abnormalities of the root structure and surrounding bone structure

Following the tracing of one or more splines onto displayed image 72, the operator enters a keyboard command or other instruction that initiates segmentation to extract the tooth volume from within the volume image data according to the entered splines. As shown in FIG. 3B, at the completion of 3-D segmentation processing, subject tooth 40 displays on display 108. FIG. 3B shows a wireframe view; an operator instruction, such as a keyboard command, toggles between surface rendering and wireframe rendering. This view of the 2-D image slices of tooth 40 is provided at an initial view angle. This initial view angle may be one of the conventional sagittal, coronal, and axial view angles that are typically used as default view angles for CBCT data or may be a different view angle. According to an embodiment of the present invention, a 3-D cutting plane is generated automatically in response to the operator instruction and an IFT optimization routine finds a suitable viewing angle that maximizes the number of root canal- and fracture-like pixels in the slice images. This is an initial cutting plane for viewing and paging through slices in the volume image, where both the root canal and the root fracture (if present) are highlighted. A 3-D interactive examination phase is then initiated, as shown in FIG. 5B, allowing the operator to change the cutting plane's normal vector N for any given oblique orientation. The operator is in control of image manipulation. This allows the operator to quickly and confidently examine abnormalities, such as fractures in 3D, without worry about missing the selected tooth.

According to an alternate embodiment of the present invention, control keys are provided to switch quickly between standard view angles. Zoom in/out utilities are also available, using a mouse or other pointer.

Figure 3C:
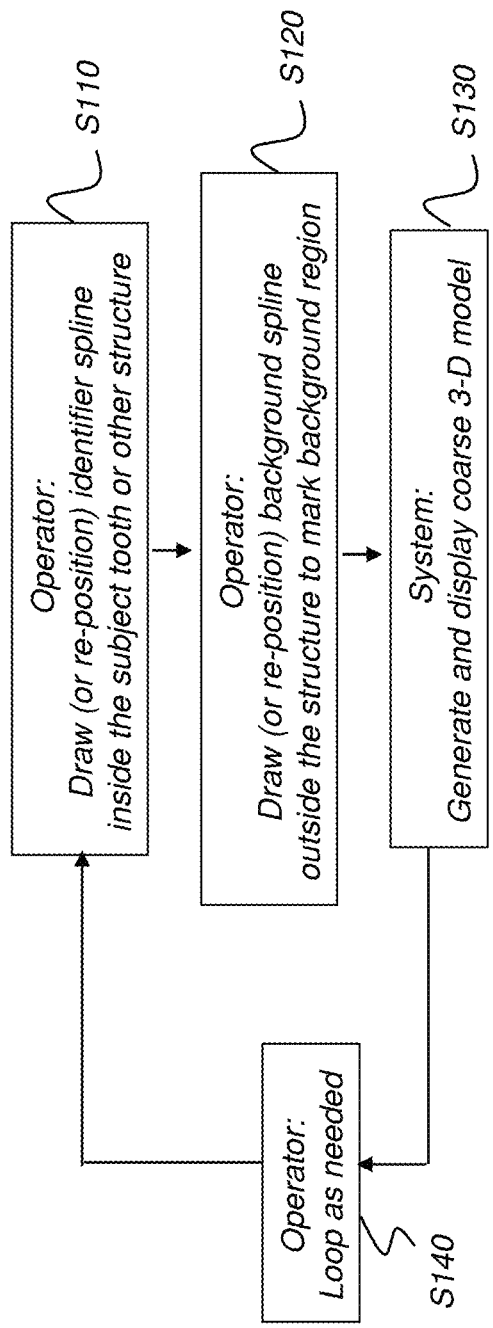
FIG. 3C is a logic flow diagram that shows operator interaction with the imaging system for obtaining a 3-D segmentation for a subject tooth.

FIG. 3C is a logic flow diagram that shows operator interaction with the imaging system for modeling and obtaining a 3-D segmentation for a subject tooth. In an object identification step S110, the operator positions one or more identifier splines over the subject tooth or portion of a tooth or other structure to be modeled. In a background identification step S120, the operator positions one or more background or sculpting splines for marking the background region. In response to operator entries in steps S110 and S120, the system generates and displays a coarse 3-D model in a model display step S130. In a looping step S140, the operator has the option to loop back through steps S110 and S120 as needed to refine and improve the results from the system that display in step S130. It is noted that steps S110 and S120 can be performed in any order and can be repeated as many times as needed, with entry of as many identifying and background splines as are useful for providing a suitable 3-D modeling of the subject tooth or other structure. According to an embodiment of the present invention, the color of a spline indicates its function, either as an indicator or background spline. Additionally, the color of an entered indicator spline determines color that is used for the generated 3-D model that displays. On-screen utilities and tools provided with the mouse or other pointer enable changing the color of an entered spline as desired.

The operator can add additional splines 50 and 52 in order to refine the segmentation provided for subject tooth 40. This feature can help, for example, where the displayed segmentation appears to be inaccurate, such as where other teeth or tissue display with the segmented subject tooth 40.

Figure 4B:
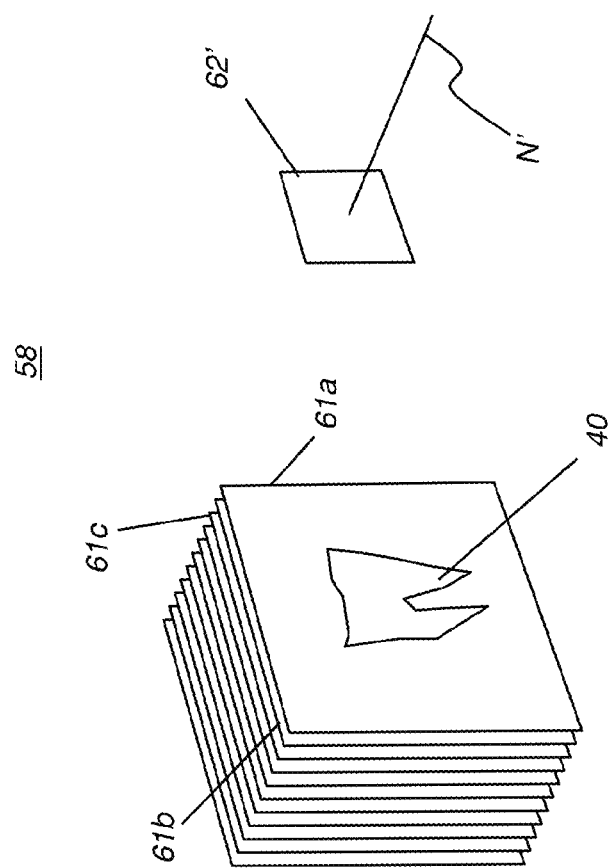

FIGS. 4A and 4B show, in schematic form, how different views of the volume data for tooth 40 can be presented and show how a cutting plane 62 can be defined and changed according to embodiments of the present invention. In FIG. 4A, a volume image 58 has its slices 60a, 60b, 60c, 60g, and other slices taken along cutting plane 62 having a normal N as shown. FIG. 4B shows how the same volume image data can be rearranged along a different cutting plane 62' having a corresponding normal N', so that the image content of volume image 58 is formed by slices 61a, 61b, 61c, and the like.

With the volume image provided in this form, the same subject tooth 40 can be viewed from alternate angles. Moreover, by paging through slices 60a, 60b, 60c, and the like, the viewer can display a slice that most effectively shows a problem or other point of interest in subject tooth 40. As is shown in FIG. 4A, a fissure 66 is most readily visible on slice 60g, obtained at the viewing angle defined by cutting plane 62. Other views of tooth 40 may not show fissure 66 or other anomaly in sufficient detail for assessment of the patient's condition.

It is noted that FIGS. 4A and 4B represent different views of the same volume data. The arrangement of voxel data into slices of the appropriate geometry is performed using volume image reconstruction techniques familiar to those skilled in the image processing arts. Paging through successive slices of the volume image can be performed in any of a number of ways, such as by pressing a keyboard key or combination of keys, using a mouse or pointer, or using other appropriate user interface utility.

Figure 5A:
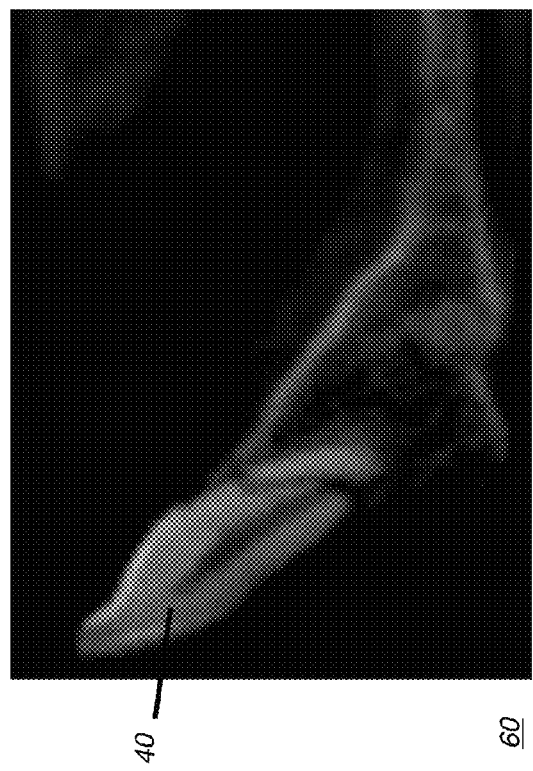

The view of FIG. 5A shows a slice 60 obtained and displayed from an image of a subject tooth 40, where slice 60 shows a root fracture, such as a VRF described earlier, or other endodontic complication. It can be appreciated that the problem with the tooth that is indicated in FIG. 5A cannot be as readily perceived in a view taken from another angle.

FIG. 5A is a default view that is calculated by an algorithm that detects root canal and tooth fracture features in the image data. According to an embodiment of the present invention, this view automatically displays when a particular tooth 40 is selected. This view is typically not a conventional axial, sagittal, or coronal view of the tooth; instead, the view angle is selected by the system for good visibility of root canal and fracture features.

Figure 6C:
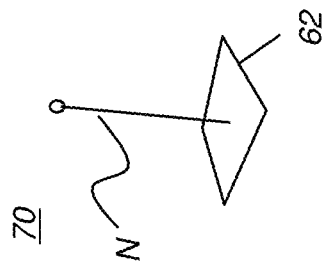
FIGS. 6A, 6B, and 6C show a view angle icon rotated to show entry of an instruction to view the data at three alternate viewing angles.
Figure 6B:
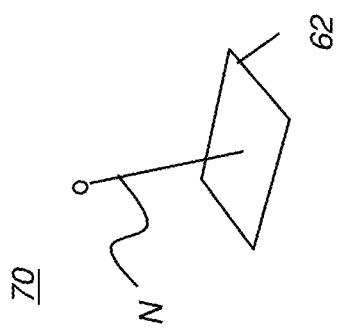
Figure 6A:
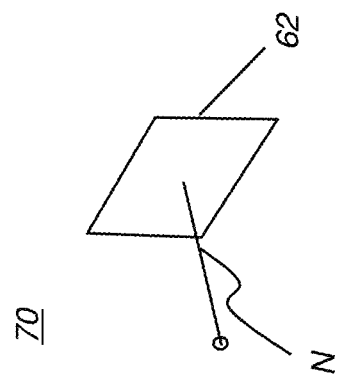

FIG. 5B also shows a volume rendering 74, as described in an article by Souza et al., entitled "Volume rendering in the presence of partial volume effects," *IEEE Trans on Medical Imaging,* 24(2): 223-225, 2005). The subject tooth 40 is highlighted using a wireframe surface rendering 72. A 3D user interaction utility for specifying the particular cutting plane 62 is shown, as used for arranging the volume image data. An angle selection icon 70 shows a cutting plane 62 and normal N in representational form, for manipulation by the operator. Using a mouse, touch screen, or other pointing mechanism, the operator can change the orientation of normal N and plane 62 of icon 70, thereby providing a plane angle instruction for modifying the angle at which the volume image data is presented. By way of example, FIGS. 6A, 6B, and 6C show icon 70 rotated to show three alternate viewing angles.

Figure 7A:
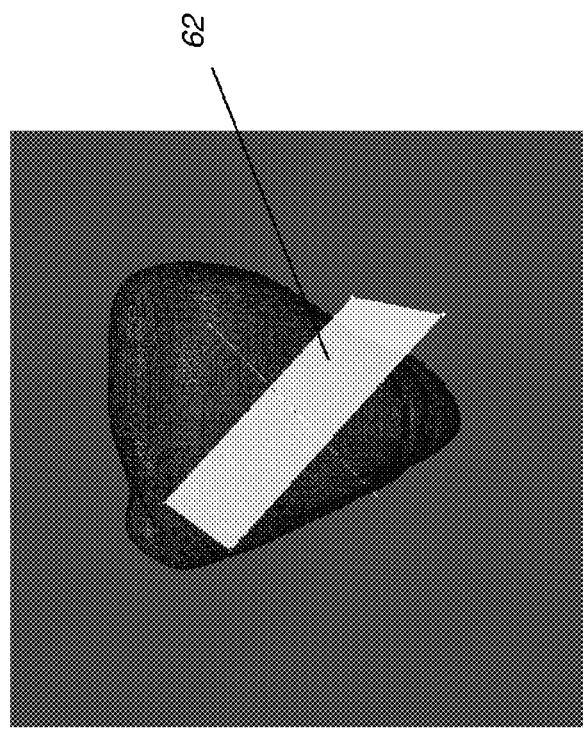
FIG. 7A shows a cutting plane position relative to a segmented tooth.
Figure 7C:
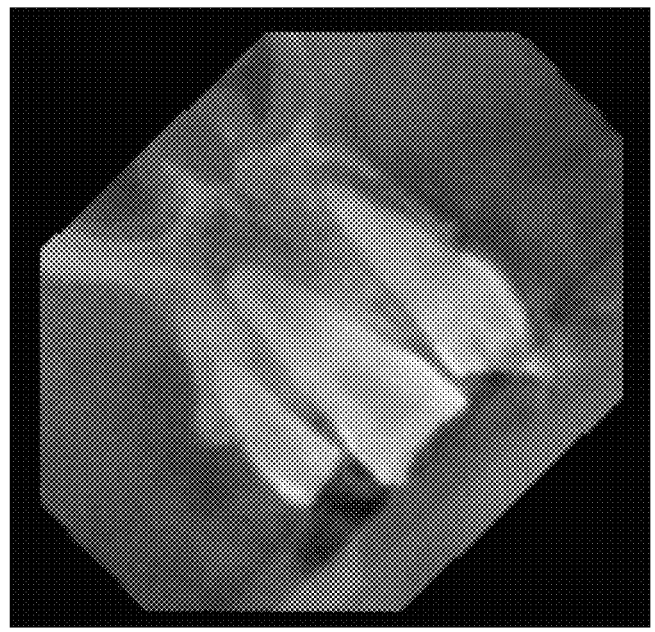
FIG. 7C shows an alternate slice from the segmented tooth according to the cutting plane setting shown in FIG. 7A.
Figure 7B:
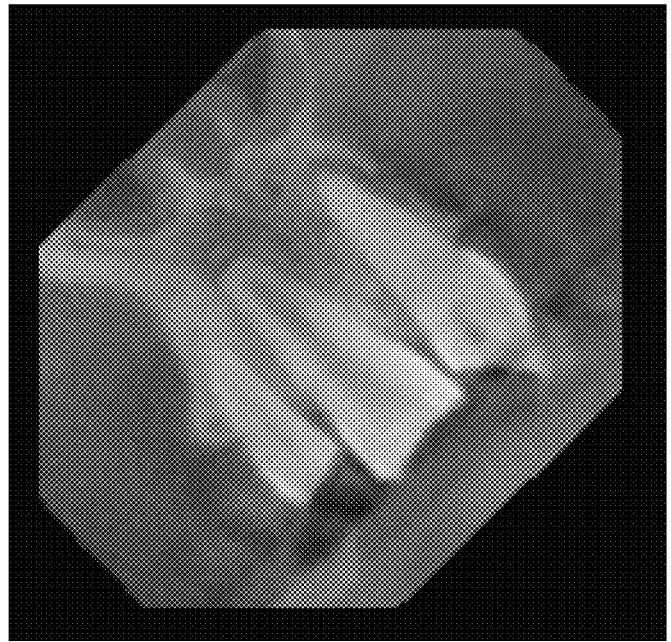
FIG. 7B shows a slice from the segmented tooth according to the cutting plane setting shown in FIG. 7A.
Figure 8B:
FIG. 8B shows a slice from the segmented tooth according to the cutting plane setting shown in FIG. 10A.
Figure 8A:
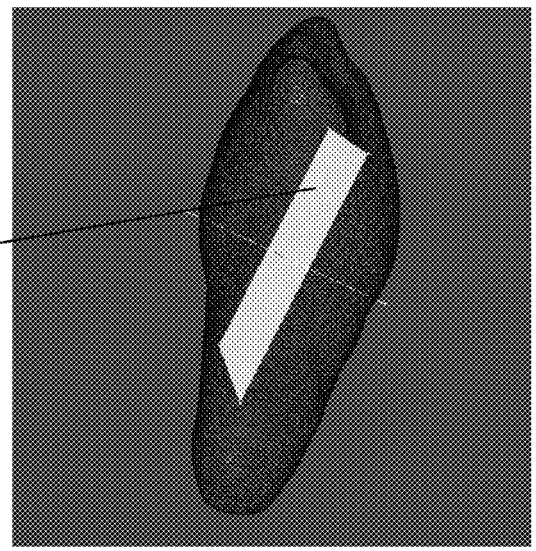
FIG. 8A shows a cutting plane position relative to a segmented tooth.

By way of example, FIG. 7A shows cutting plane 62 at a given angle with respect to the display of a segmented tooth 40. FIGS. 7B and 7C show two of the many image slices 74 and 76, respectively, that are available at the view angle of this cutting plane. According to an embodiment of the present invention, the wheel on the operator mouse is turned to quickly page through views of successive slices in a sequential manner. Other types of paging utility can alternately be used. FIGS. 8A and 8B show the use of an alternate cutting plane 62 for viewing image slices 78 from the same tooth at a different viewing angle.

Operator interface utilities for changing the view angle, paging through slices according to the view angle, marking an image to indicate the tooth for segmentation, and other functions can use keyboard commands, on-screen menu instructions provided on a display, instructions selected from a menu, such as from a pull-down menu, instructions entered by selecting control buttons on the display screen, or instructions entered from some other source.

Figure 9A:
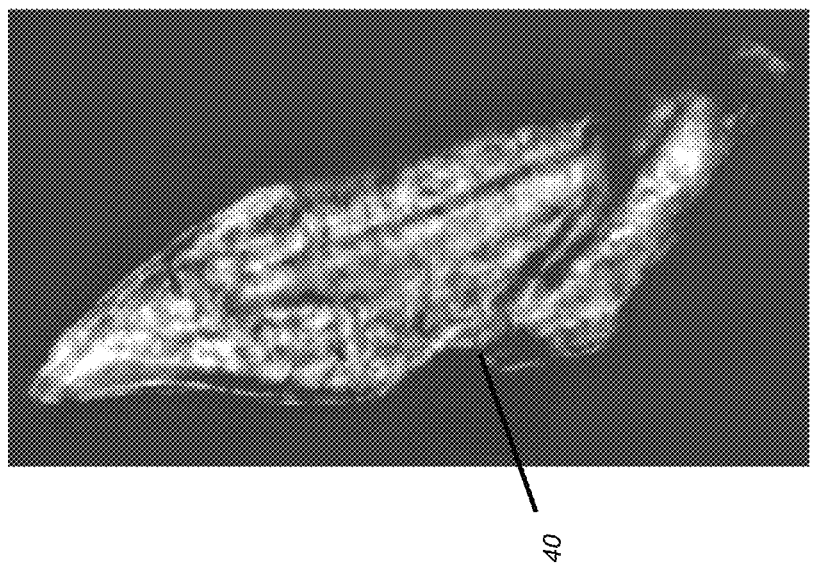
FIGS. 9A, 9B, and 9C show different volume rendering views of a subject tooth that exhibits VRF.
Figure 9B:
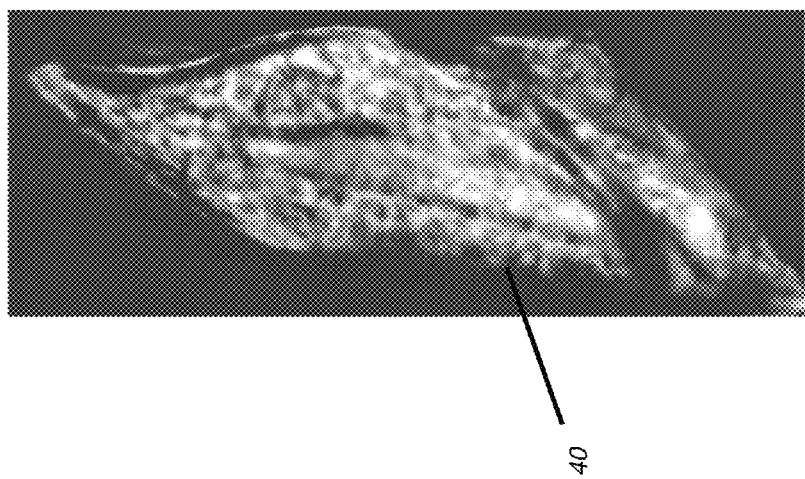
Figure 9C:
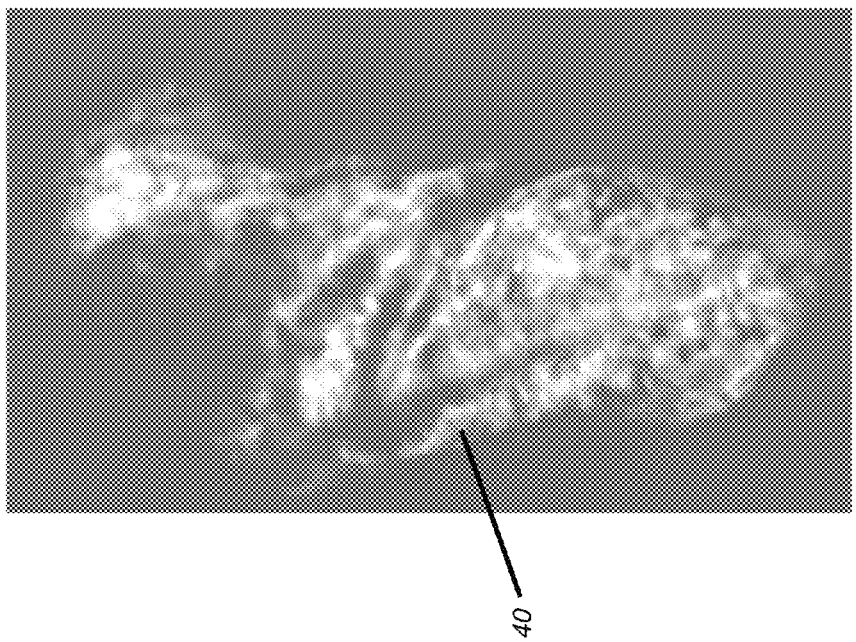

FIGS. 9A, 9B, and 9C show different volume rendering views of a subject tooth that exhibits VRF.

Embodiments of the present invention allow an operator to flexibly switch from one tooth to the next using the spline marking method described earlier with reference to FIG. 3. The operator can move to a different tooth by changing the position of spline 52, either by deleting and redrawing spline 52, or moving this graphic object onto another tooth.

Figure 10B:
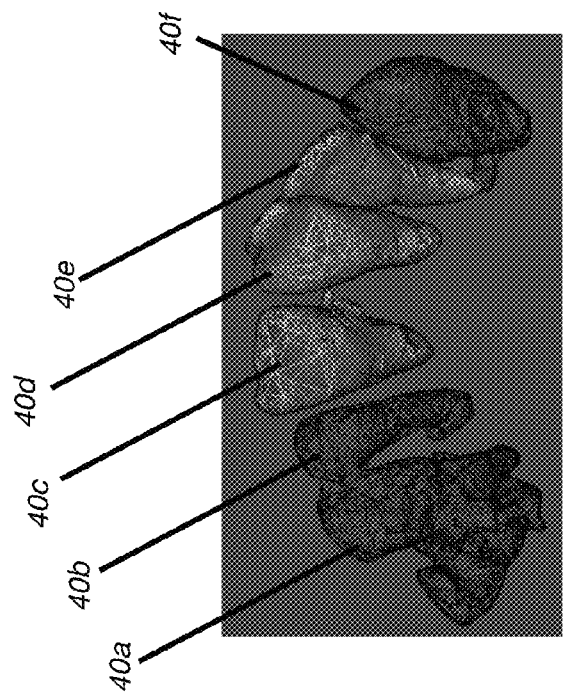
FIG. 10B shows segmented teeth displayed for the multiple spline example of FIG. 10A.
Figure 10A:
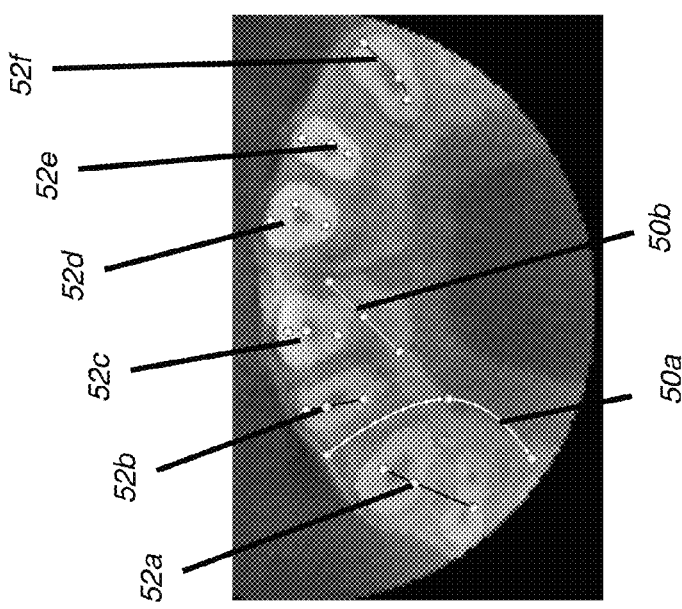
FIG. 10A shows a reference image having splines that indicate multiple teeth for segmentation.

An embodiment of the present invention also allows the operator to specify more than one subject tooth at a time for segmentation. Referring to FIG. 10A, there is shown image 72 having multiple sculpting splines 50a and 50b for indicating background content. The use of multiple sculpting splines can help to provide more information on background content to the segmentation algorithm. Splines 52a, 52b, 52c, 52d, 52e, and 52f then indicate individual subject teeth or clusters of adjacent teeth for segmentation. FIG. 10B shows a resulting segmentation, with multiple corresponding subject teeth 40a, 40b, 40c, 40d, 40e, and 40f extracted from the volume image content and displayed. Different colors can be used to distinguish the individual teeth displayed, with the colors corresponding to colors of operator-entered splines 52a, 52b, and the like. As with the single tooth display, a cutting plane can also be used for adjusting the view angle for slices of the segmented structures.

Figure 11:
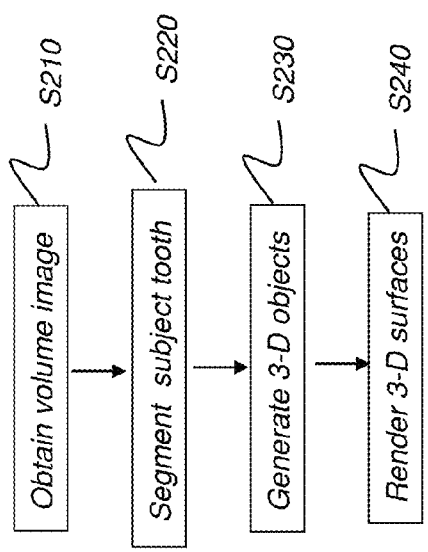
FIG. 11 is a logic flow diagram that shows a sequence of steps used for surface rendering of a volume image.

Embodiments of the present invention can be adapted to provide different 3-D visualization combinations of both volume rendering and surface rendering for a subject tooth, its internal structures, and its surrounding bone anatomy. The logic flow diagram of FIG. 11 shows a sequence of steps used for surface rendering of the volume image data. In an obtain volume step S210, a CBCT or other volume image containing the subject tooth is obtained. A segmentation step S220 follows, segmenting the subject tooth from the balance of the volume image data. A 3-D object generation step S230 then identifies features of interest from the volume image. A rendering step S240 then generates a 3-D surface rendering of the subject tooth and its related features of interest.

Figure 12C:
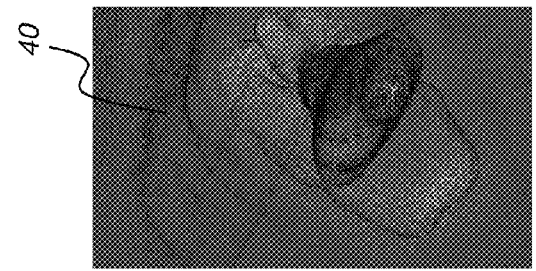
FIGS. 12A, 12B, and 12C are images that show results of surface rendering for a subject tooth having a root canal and a fracture.
Figure 12B:
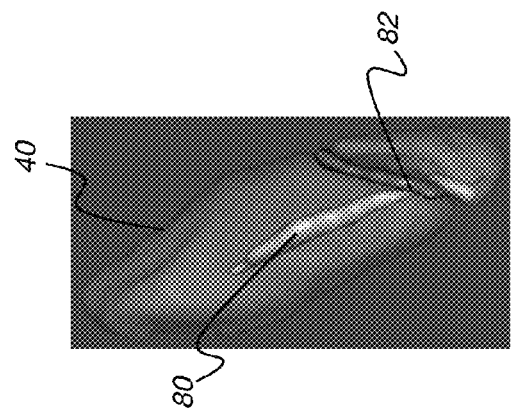
Figure 12A:
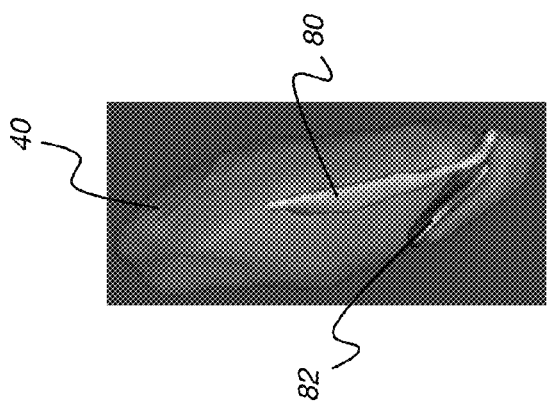

FIGS. 12A, 12B, and 12C show results of surface rendering for subject tooth 40 having a root canal 80 and a fracture 82. FIG. 12C is a wire frame view of tooth 40 from another view angle.

Figure 13:
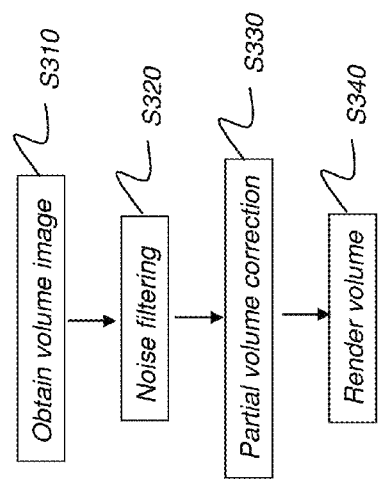
FIG. 13 is a logic flow diagram that shows a sequence of steps used for volume rendering according to an embodiment of the present invention.

FIG. 13 is a logic flow diagram that shows a sequence of steps used for volume rendering according to an embodiment of the present invention. In an obtain volume step S310, a CBCT or other volume image containing the subject tooth is obtained. An optional noise filtering step S320 provides noise filtering for the volume image data. An optional partial volume correction step S330 then corrects for partial volume effects. These imaging artifacts occur at tissue interfaces and can cause inaccuracy in both volume and surface rendering. One approach to partial volume correction is described, for example, in an article entitled "Volume Rendering in the Presence of Partial Volume Effects" by Andre Souza, Jayaram Udupa, and Punam Saha in *IEEE Transactions on Medical Imaging*, Vol. 24, No. 2, February 2005, pp. 223-235. A volume rendering step S340 is then executed, providing a rendered image of the subject tooth, such as the images shown in FIGS. 9A, 9B, and 9C, for example.

A number of different types of structure identification and image segmentation algorithms could be employed for providing segmentation according to entered operator instructions. According to an embodiment of the present invention, an image foresting transform (IFT) is used, as described, for example, in the Falcao et al. article noted earlier. Other types of image representation could alternately be used to represent the image and allow its manipulation.

As will be appreciated by one skilled in the art, the present invention may be embodied as a system or method, with parts of the system executed using a computer program product, such as computer 106 shown in FIG. 2 or other control logic processor device that is programmed with instructions for displaying an image, accepting operator instructions and input data, and responding to the operator entries. Accordingly, an embodiment of the present invention may be in the form of an entirely hardware embodiment or an embodiment combining software and hardware aspects that may all generally be referred to herein as a "circuit" or "system." Furthermore, parts of the present invention may take the form of a computer program product embodied in a computer-readable storage medium, with instructions executed by one or more computers or host processors. This medium may comprise, for example: magnetic storage media such as a magnetic disk (such as a hard drive or storage disk) or magnetic tape; optical storage media such as an optical disc, optical tape, or machine readable bar code; solid state electronic storage devices such as solid state hard drives, random access memory (RAM), or read only memory (ROM); or any other physical device or medium employed to store a computer program. The computer program for performing the method of the present invention may also be stored on computer readable storage medium that is connected to a host processor by way of the internet or other communication medium.

It is noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

Those skilled in the art will readily recognize that the equivalent of such a computer program product may also be constructed in hardware. The computer-usable or computer-readable medium could even be paper or another suitable medium upon which executable instructions are printed, as the instructions can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport computer instructions for use by, or in connection with, an instruction execution system, apparatus, or device.

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations, such feature can be combined with one or more other features of the other implementations as can be desired and advantageous for any given or particular function.

The term "at least one of" is used to mean one or more of the listed items can be selected. The term "about" indicates that the value listed can be somewhat altered, as long as the alteration does not result in nonconformance of the process or structure to the illustrated embodiment.

The term "exemplary" indicates the description is used as an example, rather than implying that it is an ideal.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for 3-D interactive examination of a subject tooth, the method executed at least in part by a computer, comprising:
   obtaining volume image data containing at least the subject tooth and background content adjacent to the subject tooth;
   displaying a first image from the volume data that shows at least the subject tooth and the background content;
   identifying a portion of the background content in the first image according to a first operator instruction;
   identifying tooth content for the at least the subject tooth in the first image according to a second operator instruction;
   segmenting the at least the subject tooth from within the volume data according to the first and second operator instructions; and
   automatically computing a cutting plane for viewing slices of the tooth that show one or more of a root canal and a tooth fracture; and
   displaying the segmented subject tooth according to the computed cutting plane.

2. The method of claim 1 further comprising changing the display of the segmented subject tooth within the volume image data according to a paging instruction from an operator.

3. The method of claim 1 further comprising changing a relative angle of the cutting plane in response to a plane angle adjustment instruction from an operator.

4. The method of claim 1 further comprising forming a reduced-resolution copy of the volume image data prior to segmenting the subject tooth.

5. The method of claim 1 further comprising applying volume rendering and surface rendering after correcting for partial volume effects in the volume image data.

6. The method of claim 1 further comprising defining the first operator instruction by drawing a spline on the displayed first image.

7. The method of claim 1 further comprising defining the second operator instruction by drawing a spline over two or more teeth on the displayed first image.

8. The method of claim 1 wherein the subject tooth is a first subject tooth and further comprising accepting a third operator instruction that indicates location of tooth content for a second subject tooth in the first image.

9. The method of claim 1 further comprising automatically highlighting a root canal or a fracture in the displayed segmented subject tooth.

10. The method of claim 1 wherein displaying the segmented subject tooth comprises rendering a surface image of the subject tooth.

11. The method of claim 1 wherein automatically computing a cutting plane comprises using an image foresting transform optimization routine to determine a suitable viewing angle that maximizes the number of root canal and fracture-like pixels in the slices of the tooth.

12. A method for displaying a volume image of one or more subject teeth, the method executed at least in part by a computer, comprising:
   obtaining volume image data including the one or more subject teeth and background content outside of the subject teeth;
   displaying a first image from the volume data that shows at least the subject teeth and the background content;
   accepting a first operator instruction that indicates the background content in the first image;
   accepting a second operator instruction that indicates location of tooth content for the one or more subject teeth in the first image;
   segmenting the one or more subject teeth from within the volume data according to the first and second operator instructions;
   automatically computing a cutting plane for the volume image content of the segmented one or more subject teeth for viewing slices of the tooth that show one or more of a root canal and a tooth fracture; and
   displaying a first slice of the segmented subject teeth according to the automatically computed cutting plane.

13. The method of claim 12 wherein the first operator instruction comprises a spline drawn on the displayed first image.

14. The method of claim 12 wherein automatically computing a cutting plane comprises using an image foresting transform optimization routine to determine a suitable viewing angle that maximizes the number of root canal and fracture-like pixels in the slices of the tooth.

15. The method of claim 12 further comprising automatically highlighting a root canal or a fracture in the displayed segmented subject tooth.

* * * * *